Feb. 8, 1966   O. HOLSTEIN ETAL   3,234,331
KEY SENDER FOR TELEPRINTERS AND DATA-PROCESSING
INPUT DEVICES, OR THE LIKE
Filed March 29, 1962   5 Sheets-Sheet 1
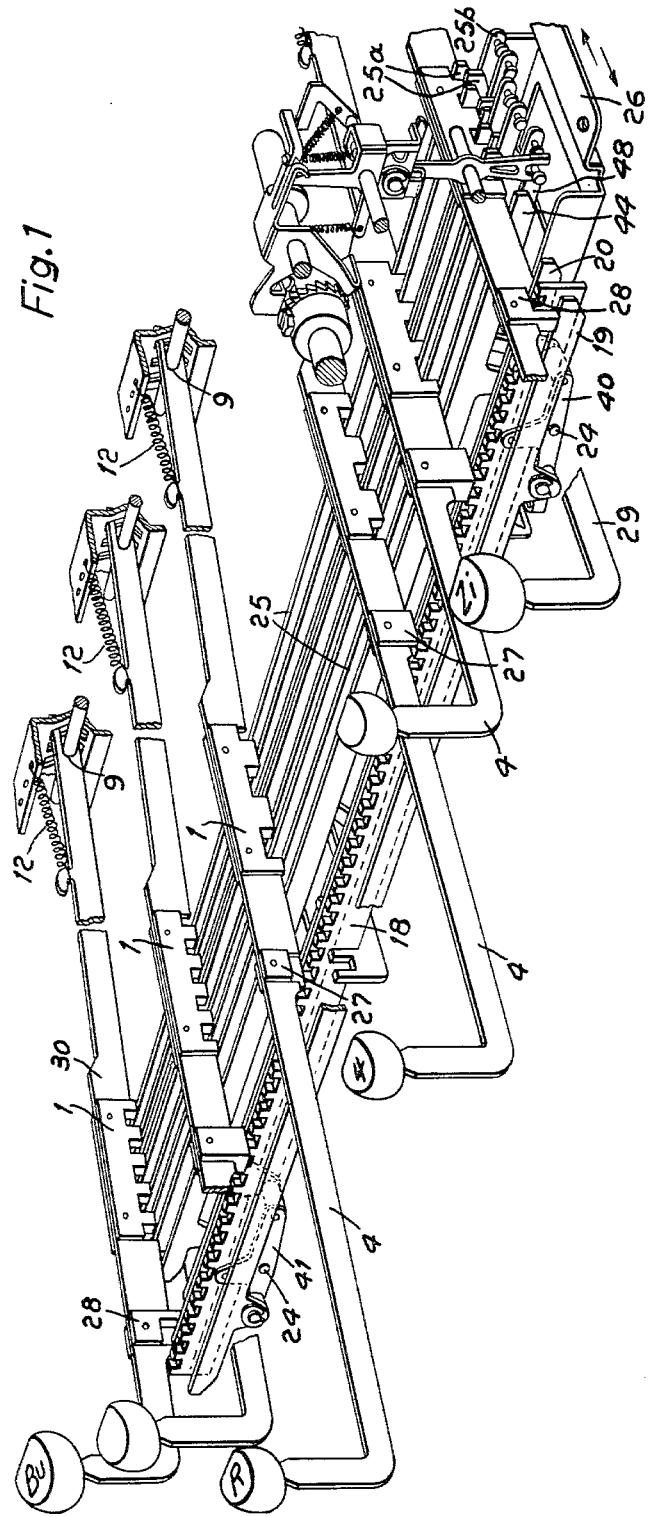
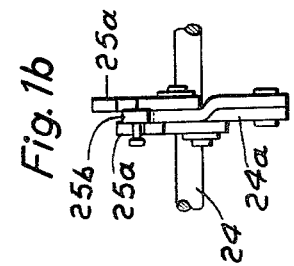
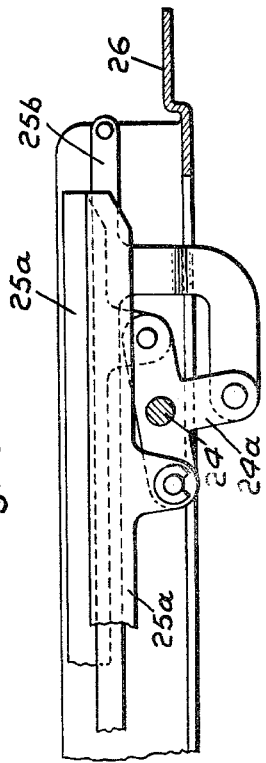
INVENTORS.
OTTO HOLSTEIN
BY HEINZ DEIMLING
ATTORNEY Feb. 8, 1966  O. HOLSTEIN ETAL  3,234,331
KEY SENDER FOR TELEPRINTERS AND DATA-PROCESSING
INPUT DEVICES, OR THE LIKE
Filed March 29, 1962  5 Sheets-Sheet 2
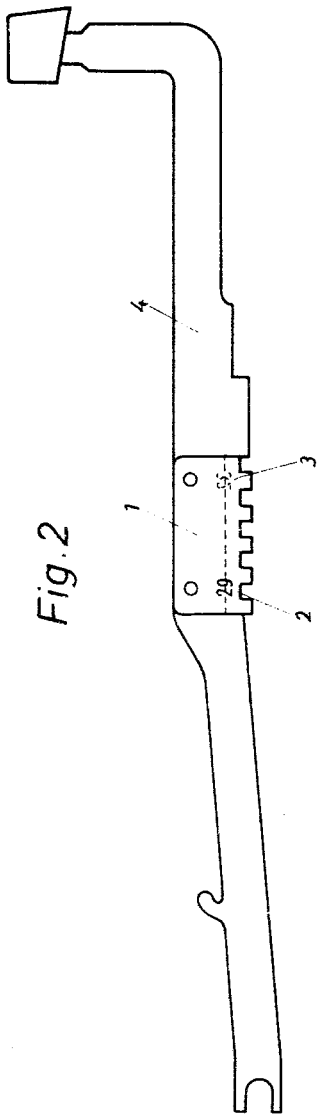
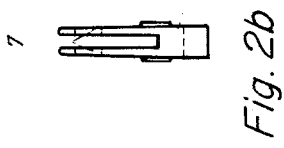
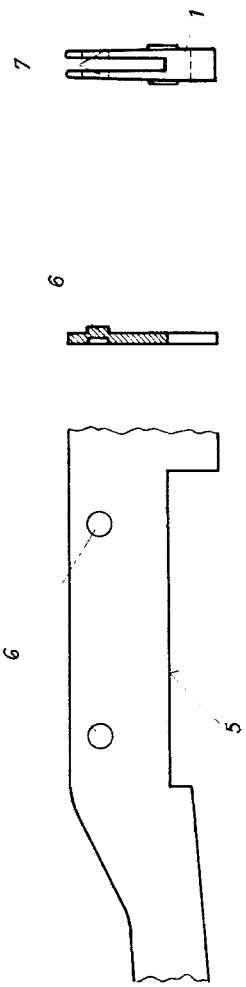
INVENTORS
OTTO HOLSTEIN
HEINZ DEIMLING
BY
ATTORNEY

INVENTORS
OTTO HOLSTEIN
HEINZ DEIMLING

United States Patent Office 3,234,331
Patented Feb. 8, 1966

3,234,331
KEY SENDER FOR TELEPRINTERS AND DATA-PROCESSING INPUT DEVICES, OR THE LIKE
Otto Holstein, Pforzheim, and Heinz Deimling, Singen, Pforzheim, Germany, assignors to International Standard Electric Corporation, New York, N.Y., a corporation of Delaware
Filed Mar. 29, 1962, Ser. No. 183,644
Claims priority, application Germany, Apr. 1, 1961, St 17,644, St 17,645; Apr. 27, 1961, St 17,744, St 17,745
8 Claims. (Cl. 178—79)

This invention relates to a key sender for teleprinters and data-processing input devices, or the like, consisting of a number of key levers provided with detachable combs toothed in accordance with the respectively employed code, cooperating with a set of transmitting selecting bars consisting of smooth, groove-less bars, of a lock bar, the position of which is dependent upon the case shift signals, and of a universal release bar automatically initiating the transmission (sending) in response to every depression of the keys.

The use of separate combs for each combination, as already proposed in connection with the hitherto known key senders of this type, permits profitable series manufacture of the key levers, but in view of the great number of different combs necessitated by the respectively employed telegraph code, storage of the combs becomes inconvenient.

Likewise, the hitherto generally used lock bars provided with an irregular helical gear are uneconomical to manufacture, and have the considerable disadvantage of individual design in accordance with the assignment of the individual key levers to one of the two case groups, so that every rearrangement of the printing types in accordance with the keyboards that are in use in foreign countries, or even the simple interchange of two printing types or the supplementary completion of the keyboard, will always call for the employment of a lock bar adapted to this particular type of keyboard.

Moreover, the universal release bars which are necessary for tripping the sender have some disadvantages, especially with respect to the hitherto conventional forms of bars of the helical-gear type, which are horizontally displaceable via the key levers. High manufacturing cost is the principal disadvantage. In the case of sectional release bars which are slewably mounted transversely in relation to the keys it is possible that, in unfavourable cases, the unbalanced load on the release bar will result in a twisting of the latter and, consequently, in faulty tripping operations. Furthermore, a certain chatter effect becomes noticeable at high writing speeds, so that reliable operation of the sender is not always ensured. In order to ensure an easy mounting of the entire keyboard, it is necessary that the individual keys, together with their spring arrangement, can be easily inserted from above, thus avoiding readjustments which are presently still necessary and take considerable time.

Therefore, according to the invention, there is proposed a key sender avoiding all of the aforementioned disadvantages, in that the number of combination combs to be stored can be reduced by 50% because of the double utilization of the combs. A lock bar arrangement is provided permitting a random assignment of the key levers to one of the two case groups, and, for the purpose of tripping the sender, a universal release bar arrangement has been chosen which is favorable from the manufacturing-technical point of view and is not subjected to torsional force.

All of the structural groups can be mounted prior to the final assembly, and no additional adjustment is required, so that a final assembly may be carried out in accordance with the building block principle; yet the simple way of storing the components and the spring-mounting arrangement of the key levers remains.

One feature of the invention is the assigning of two code combinations to each comb, the utilization of which becomes available by the inverse mounting of two combs of the same type on different key levers.

The above-mentioned and other features and objects of this invention will become more apparent by reference to the following description taken in conjunction with the accompanying drawings in which:

FIG. 1 shows in a perspective view the basic conception of the inventive type of key sender;

FIGS. 1a and 1b show, respectively, a side view and an end view of one of the rocking elements for supporting the selecting bars 25;

FIG. 2 is the side view of one of the key levers of FIG. 1 with the combination comb, according to the invention, shown snapped in place;

FIG. 2a shows a detail and cross-section of the same key lever at a point where the combination comb is to be attached;

FIG. 2b is the side view of a combination comb in accordance with the invention;

FIG. 4a is a detail of the front view of the lock bar and key lever cogs indicated in FIG. 4.

Figure 3:
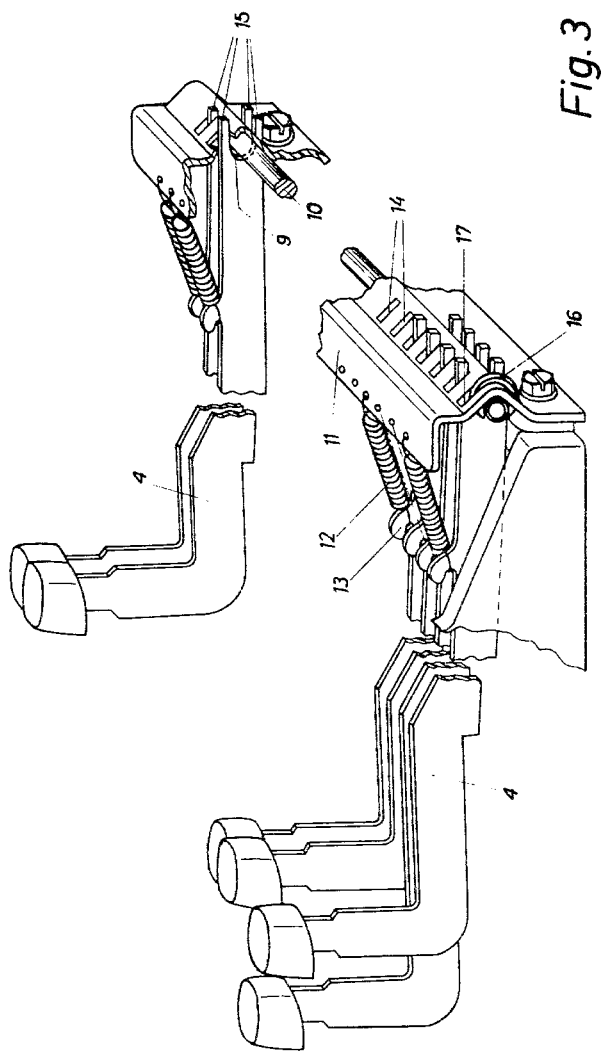
FIG. 3 shows details of the key-suspension and spring mounting arrangement according to FIG. 1.

The key sender, as shown in the drawings, is not complete; for clarity all parts have been omitted which are not absolutely necessary for understanding of the invention.

*General description*

Before describing the different features of the invention in detail, a brief outline of the basic construction of the inventive type of key sender with reference being made to FIG. 1 of the drawings follows.

Transversely in relation to the keys and below them is positioned the set of selecting bars 25. They consist of pairs of bars 25a which are mutually vertically displaceable in parallel to each other and transfer their motion via rocking elements 24a, pivoted on shaft 24, to a third bar 25b of each pair which depending on the actuation of either the one or the other bar 25a by a key lever, performs a horizontal movement either to the right or left, which, in the conventional manner, is utilized for setting the (not shown) transmitting contacts.

Within the range of these selecting bars 25, the keys are provided with combination combs 1, the teeth of which are arranged in such a way that each time a key is operated, only one of the bars 25a is actuated, causing the proper setting of the bar 25b in accordance with the respective code.

For the purpose of supporting the keys fork-shaped slots 9 are provided at the key ends and the keys pulled in the horizontal as well as in the vertical direction into their final or end positions by the action of a spring 12 lying in an inclined position.

In front of the set of selecting bars 25, but forming one unit therewith in the tray 26, there is arranged the universal or release bar 44/48. This bar consists of two bars which are dependent upon one another in their movements, and via which the vertically directed key pressure is changed into a horizontally directed release motion which, via means known per se, causes the clutch of the key sender to be engaged for one rotation.

Outside and in front of the tray 26 there is disposed the lock bar arrangement 18, 19, 20. This arrangement consists of an equally toothed bar 18 which, similar to the selecting bars, is in connection with two further bars 19 and 20, via rocking elements 40 and 41, and in dependence upon their movement. These rockers are pivoted on the extensions of the shafts 24 about which move both the selecting bars 25 and the universal or release bars 44, 48. Within the range of this bar arrangement all of the keys are provided with cogs 27, 28, with the cogs 28 of the two "letter" and "figure" shift keys being so designed that they horizontally displace the toothed lock bar 18, via the actuation of either bar 19 or 20 in the vertical direction; so that with the depression of either the "letters" or "figures" key, the staggered cogs 27 of the remaining keys are released in only one of the two lock bar positions, depending on how they are mounted or inserted.

The tray 26 with the set of selecting bars 25 and the lock bar arrangement 18, 19, 20 and the universal bar arrangement 44, 48, as well as the rear key support and the front key guidance (not shown), are assembled together with the actual transmitting arrangement which is only partly shown to form one unit within a key sender frame (not shown).

*Interchangeable selector combs for key levers*

In FIG. 2, the combination comb 1 is shown mounted on the key lever 4. The two code combinations provided by the teeth of the comb 1 when mounted in the normal or reversed position, are designated by the numbers 2 and 3 visible on the comb 1. Depending on the mode of mounting, one of these numbers, either 2 or 3, is always visible and denotes the combination of the telegraph code employed. The second combination of each comb 1 is available by simply mounting the comb in reversed position, so that the teeth corresponding to spaces and marks of a code combination are exactly reversed. Owing to this arrangement, the number of combs is reduced to one half, while the numbering of the combs 1 appreciably facilitates the storage of such combs and their mounting.

Apart from its teeth, the comb 1 is of a fully symmetrical design as may be seen in FIGS. 2 and 2b. The combs are manufactured from a material that can be cast, injection-molded, and stamped; the elasticity of this material permits sliding the comb upon the key lever 4 without any special mounting means. FIG. 2b shows the fork-shaped upper section of comb 1 in which the holes 7 are provided for insertion of the bosses 6 on the key lever as shown in FIG. 2a, as the comb is snapped into position, so that the comb assumes a defined position. To reduce the overall height of the set of key levers, each key lever has a recess 5, as shown in FIG. 2a, along that section of the key lever taking up the comb 1.

*Key-lever suspension*

As shown in FIG. 3, the key lever 4 is provided, at its point of rotation, with a fork-shaped extension 9. The key lever 4 is supported on a shaft 10. This shaft 10 is positioned loosely in a profiled bar 11, the profile of which is adapted to the shaft 10. A locking washer 16, slipped onto the shaft 10 engages the slot 17, preventing the shaft 10 from being displaced laterally.

In order to provide the keys with a guidance and spacing limitation within the keyboard, the bar 11 is provided with corresponding slots 14. These slots 14 are engaged by the portions 15 of the key levers 4, thus providing both a guidance and a sideway limitation.

The spring 12 with its pretension, pulls the key lever 4 against the profiled bar 11, serving a double purpose on account of its inclined position. First it pulls the key lever 4 with a sufficient force against the lever bearing point 10, i.e., against the shaft 10, thus protecting the lever from falling out and from being subjected to any accidental tensile stress. This stress can be reliably avoided by providing a hood or cover plate of the kind frequently used nowadays as a keyboard enclosure, containing recesses for the key buttons, and which may be removed for working at the keyboard. Secondly, subsequently to the depressing of a key, the spring 12 will serve to return the key to its normal position. On account of this construction arrangement, it is now possible to perform easy installation and removal of the key lever 4 by simply disengaging the spring 12 from the portion 13 of the key lever 4, and by pulling out the key 8.

This arrangement is also suitable for centrally supported key levers. In that case, the fork-shaped extension 9 is arranged either above or below the actual lever portion 4 with the portions 15 extending parallel in relation to the lever. The inclined position of the spring 12 will then have to be adapted to the other lever ratio, whereas the bar 11 has to be designed in such a way that an easy removal from the front will remain possible upon unhooking the spring 12.

*Locking devices*

Figure 4:
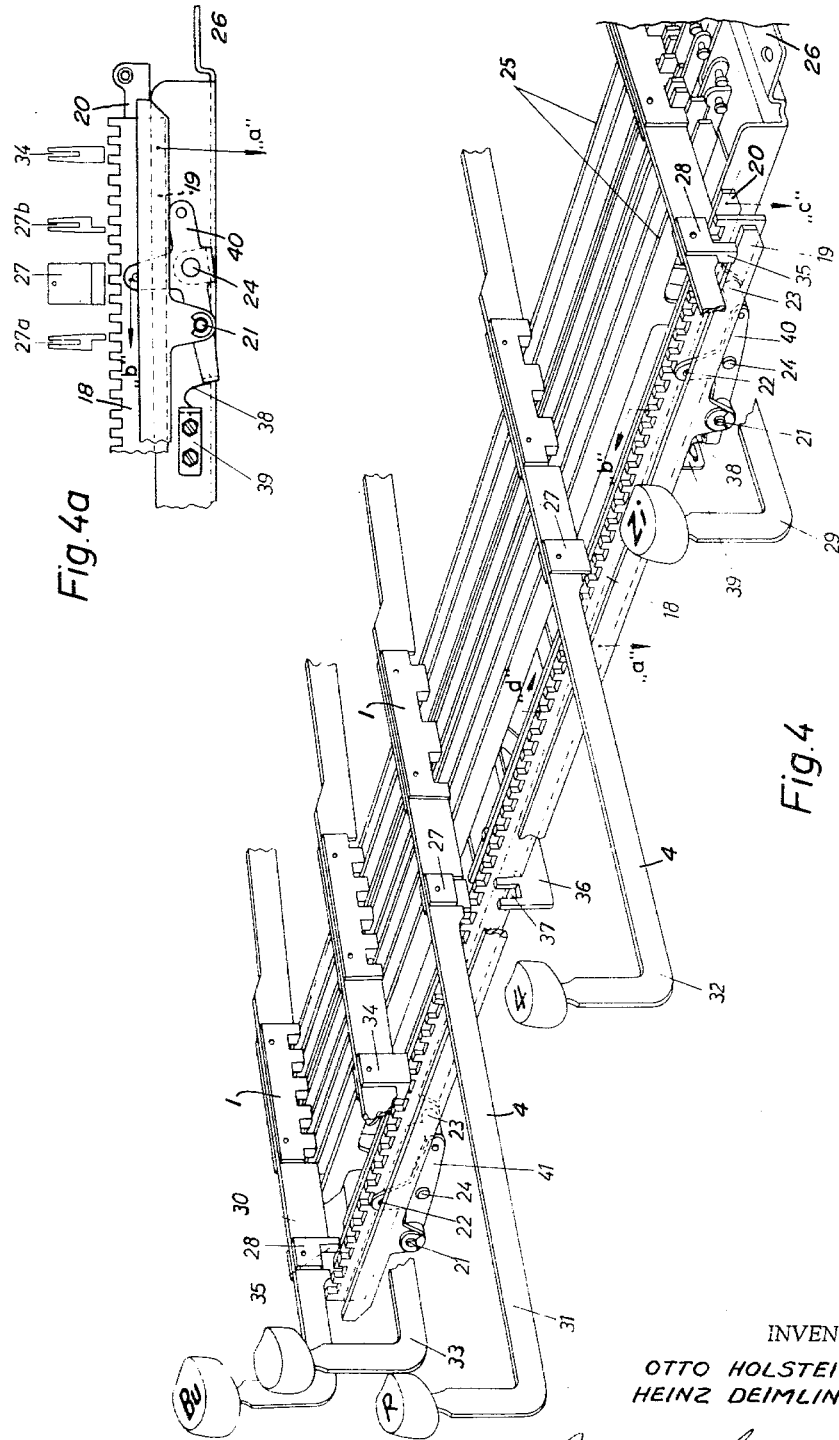
FIG. 4 shows the appearance and arrangement of the lock bar in accordance with FIG. 1 in connection with the various key levers and a set of selecting bars.

As shown in FIG. 4, the uniform-pitch lock bar 18 may be moved by the shift bars 19 and 20 via pivot points 21, 22 and 23 of the toggle levers 40 and 41. The toggle levers 40 and 41 are rotatably mounted on the shafts 24. The shafts 24 form the supports for conventional bars 25, and have their bearings in the tray 26.

To actuate the lock bar 18, the figures- and letter-shift key levers 29 and 30 each have a detachable cog 28. When the figures-shift key lever 29 is operated, the prong 35 of the cog 28 presses the shift bar 19 downwards in the direction of the arrow "a." Consequently, the uniform pitch lock bar 18 is moved in the direction of the arrow "b." When the lock bar 18 has been so displaced, the figures keys are free to be operated, while the letters keys are locked. Likewise, when the letters-shift key lever 30 is operated, the prong 35 of the cog 28 on the lever 30 moves the shift bar 20 in the direction of the arrow "c" and, hence, the lock bar 18 in the direction of the arrow "d." This is so because the cog 28 on the lever 30 was turned through 180° for mounting, in reference to the position of the prong 35 of cog 28 on the lever 29. Now the letters key levers are operable, while the figures key levers are locked. The lock bar 18 has to travel a distance exactly corresponding to the spacing between the key levers. For this reason, the tray 26 has an adjustable stop 36 with slots 37, one of which is visible in FIG. 4. This stop limits the downward motion of the shift bars 19 and 20, respectively. To retain the lock bar 18 in the position to which it has been displaced, a dead-centre spring 38 is provided between the toggle lever 40 and an adjustable back rest 39. This back rest 39 permits adjustment of the effective pressure to a desirable value during the shifting operation. In spite of its uniform pitch, the lock bar 18 may be employed for all varieties of keyboard configurations, because each key lever associated with one of the two groups of keys is equipped with a cog 27. As seen from FIG. 4a, this cog 27 may be turned around its vertical axis by 180° so that it may assume the positions shown in 27a and 27b. In the case of 27a, operation of the associated key lever is impossible because the prong of the cog 27a faces a tooth of the lock bar 18; likewise, the key lever associated with the cog 27b may be operated because the prong of the cog 27b may enter into the space between two teeth of the lock bar 18. If the lock bar 18 is displaced for the purpose of case shifting, the key lever associated with the cog 27a becomes operable, while the cog 27b prevents operation of its key lever.

Since the easily detachable and interchangeable cogs 27 permit association of each key lever with one or the other case shift, both the manufacturing and the spare-part storage procedures are facilitated.

The cog 34 has a prong extending over the whole width of the cog and is thus capable of locking the key 33 in FIG. 4 regardless of the position of the lock bar 18. The key lever 33 may be associated, for example, with a combination not yet in use in international traffic, but contemplated for future use or use in private systems for additional control purposes, for example, the combination number "32."

*Universal bar arrangement*

Figure 5:
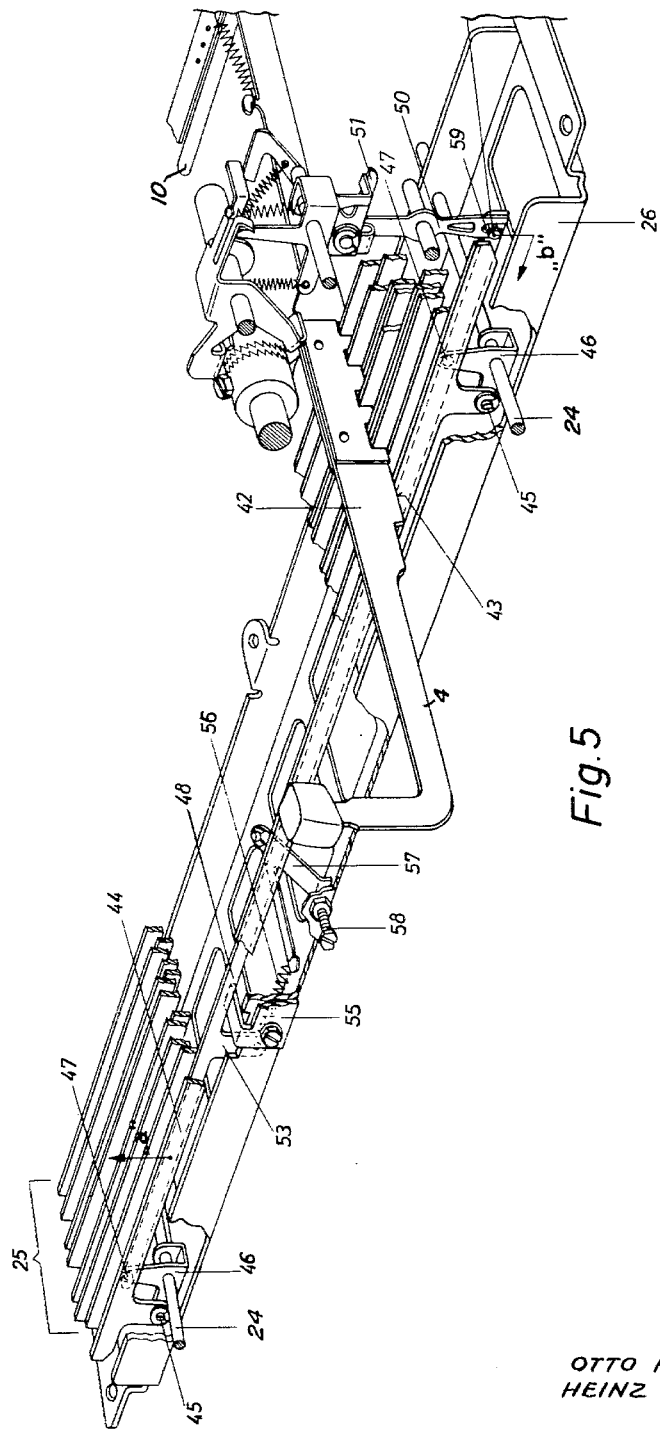
FIG. 5 shows the arrangement of the universal or release bar of FIG. 1 in relation to the selecting bars, as well as the way in which they are actuated by a key lever.

In FIG. 5 the two bell-crank levers 46 are arranged on two shafts 24 otherwise utilized to support the selecting bars 25. The bell-crank levers 46 interconnect the primary bar 44 and the secondary bar 48 by their respective pivots 45 and 47 so that a limited, predominantly vertical motion of the primary bar 44 causes the bell-crank levers 46 to displace the secondary bar 48 in a horizontal direction.

In the normal position, the lug 53 of the secondary bar 48 is pulled by spring 56 against the adjustable stop 55; as a result, the primary bar 44 is pulled in the direction "a" indicated. The adjustable stop 55 and the lug 53 of the secondary bar 48 serve to adjust the airgap between the primary bar 44 and the lower operating edges 43 of the key levers 42. The stop 55 is mounted in the tray 26. When one of the key levers 42 is operated, its lower edge 43 forces the primary bar 44 in a direction opposite to the direction "a." Consequently, the secondary bar 48 bearing a pin 49 at one end is moved in the direction of arrow "b" opposite to the force of its spring 56. Since the control fork 50 connected to the trip latch 51 is with its slit 59 in engagement with the pin 49 of the secondary bar 48, the control fork 50 and the trip latch 51 are turned in a clockwise direction, thus tripping the centre clutch in the well-known manner. Even under the most unfavorable conditions, for instance, when a key lever is arranged at the outermost end of the keyboard, the primary bar 44 cannot be twisted or tilted, because the on-edge sectional construction of the two bars 44 and 48 and their form-locked operation excludes these changes under normal operating conditions. In addition, this arrangement greatly reduces the appearance of chatter.

The pressure of the key levers can be adjusted by adjusting the tension of the spring 56 with the aid of an adjusting screw 58 acting upon a lever 57 rotatably mounted in the tray 26.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. A key sender for teleprinters comprising a plurality of key levers representing characters to be transmitted, means for pivotally mounting said key levers, a plurality of transmitting selecting bars mounted transversely of said levers so as to be displaceable in the direction of movement of said levers, a universal release bar operatively connected with said key levers for initiating the transmission of a character in response to the operation of any key lever, a comb detachably mounted on each of said key levers in either of two positions and adapted to engage predetermined ones of said selecting bars when said key lever is depressed, each of said combs being provided with teeth arranged to engage a predetermined combination of selecting bars when in one position on its associated key lever and another combination of selecting bars when in the other position on said key lever.

2. A key sender for teleprinters, according to claim 1, in which each key lever is provided with a projection on its side where the comb is applied, and each comb is slotted to fit over the key lever and is provided with a pair of depressions for selective engagement with said projection in the two different positions of said comb for precisely locating said comb on said key lever, said comb being sufficiently resilient to snap over said key lever.

3. A key sender for teleprinters and data-processing input devices and the like having a transmission mechanism and including first means comprising groups of key levers representing characters for selecting the character to be transmitted in accordance with a designated code; means responsive to said first means for setting the transmission mechanism; second means for inhibiting the operation of all key levers of said first means except those of a selected group and transmitting controls operatively connected to said first means for initiating the sending of the selected character in response to the instruction from said first means, the said first means including a plurality of combs mounted on said key levers, said combs being toothed in accordance with the employed code in which each comb has two assigned code combinations, the meaning of which becomes available by the relative mounting of said comb to said key lever; and including a visible number placed on the comb and forming part of a numbering system indicating the code combination of the respective code employed, and said means for setting the transmission mechanism includes a set of transmitting selecting bars which are engaged by said combs.

4. A key sender for teleprinters and data-processing input devices and the like having a transmission mechanism and including first means comprising groups of key levers representing characters for selecting the character to be transmitted in accordance with a designated code; means responsive to said first means for setting the transmission mechanism; second means for inhibiting the operation of all key levers of said first means except those of a selected group and transmitting controls operatively connected to said first means for initiating the sending of the selected character in response to the instruction from said first means, the said second means including a lock-bar, the position of which is dependent upon case shift signals; said lock bar being shifted via shift bars which are in communication with the lock-bar via bell-crank levers; said lock-bar having means for adjusting its travel distance and retaining it in the position to which it is shifted, the said means for limiting the lock-bar travel including an adjustable limit stop which limits the stroke of said shift bars, thereby providing adjustment of the two normal positions of the said lock-bar; whereby retention of the lock-bar in one of the two said normal positions is accomplished with springs provided at the dead centers of the strokes of the said shift bars, thereby retaining the said shift bars in the positions to which they are shifted; the force of the said spring being adjustable via an adjustable back rest.

5. An arrangement, according to claim 4, in which there are two shift bars and the case shift signals actuate a selected one of said two shift bars via reversible cogs; said cog influencing the shift bar to be selected in accordance with the positioning of said reversible cog on the case shift key lever.

6. A key sender for teleprinters and data-processing input devices and the like having a transmission mechanism and including first means comprising groups of key levers representing characters for selecting the character to be transmitted in accordance with a designated code; means responsive to said first means for setting the transmission mechanism; second means for inhibiting the operation of all key levers of said first means except those of a selected group and transmitting controls operatively connected to said first means for initiating the sending of the selected character in response to the instruction from said first means, the second means including a lock-bar having a plurality of teeth with uniform tooth pitch corresponding to the spacing between the said key levers, the position of the lock-bar being dependent upon case shift signals; said lock-bar being shifted via shift bars which are in communication with the lock-bar; said lock-bar having means for adjusting its travel distance and retaining it in the position to which it is shifted; the said key levers being provided with reversible cogs having prongs adapted to engage said lock-bar and character designated key levers can or cannot be released dependent upon the relative location of said reversible cogs on said key levers and the location of said lock-bar; said key levers being released in only one position of the lock-bar when the cog's prong and the space between the lock-bar teeth mate.

7. A key sender for teleprinters and data-processing input devices and the like having a transmission mechanism and including first means comprising groups of key levers representing characters for selecting the character to be transmitted in accordance with a designated code; means responsive to said first means for setting the transmission mechanism; second means for inhibiting the operation of all key levers of said first means except those of a selected group and transmitting controls operatively connected to said first means for initiating the sending of the selected character in response to the instruction from said first means, the said transmitting controls including a sender clutch and a two-bar combination, pivoted bell-crank levers for supporting said bars in such a manner that the actuation of a key lever causes one bar to be displaced vertically, while the other bar is caused to perform a horizontal motion, and means for tripping said sender clutch by the movement of one of said bars.

8. An arrangement, according to claim 7, in which one of said bars is subjected to the force of a spring via the other bar, the force of the said spring opposing the direction of operation of key levers, with adjustment of the air gap between the key levers and the vertically displaceable bar realized by an adjustable stop for the said one bar.

References Cited by the Examiner

UNITED STATES PATENTS

| | | | |
|---|---|---|---|
| 1,814,236 | 7/1931 | Wusteney | 178—79 |
| 2,255,201 | 9/1941 | Wheelock | 340—365 |
| 2,266,027 | 12/1941 | Gubisch | 178—25 X |
| 2,494,232 | 1/1950 | Estoup | 178—23 |
| 2,559,637 | 7/1951 | Kirchel | 178—17 |

FOREIGN PATENTS 60,527  2/1948  Netherlands.

NEIL C. READ, *Primary Examiner.*

ROBERT H. ROSE, *Examiner.*